United States Patent [19]

Sudo et al.

[11] Patent Number: 6,111,921

[45] Date of Patent: Aug. 29, 2000

[54] ESTIMATOR OF ERROR RATE

[75] Inventors: Hiroaki Sudo; Katsuhiko Hiramatsu; Mitsuru Uesugi, all of Yokohama, Japan

[73] Assignee: Matsushita Electric Industrial Co., Ltd., Osaka, Japan

[21] Appl. No.: 09/028,853

[22] Filed: Feb. 24, 1998

[30] Foreign Application Priority Data

Mar. 18, 1997 [JP] Japan ................................. 9-083423

[51] Int. Cl.[7] .............................. H04L 27/20; H04L 1/20
[52] U.S. Cl. ........................................... 375/329; 375/226
[58] Field of Search .................................. 375/226, 344, 375/329, 331, 332, 279, 281; 330/52; 329/304

[56] References Cited

U.S. PATENT DOCUMENTS

| | | | |
|---|---|---|---|
| 5,249,204 | 9/1993 | Funderburk et al. | 375/344 |
| 5,631,554 | 5/1997 | Briese et al. | 324/76.77 |
| 5,867,531 | 2/1999 | Shiino et al. | 375/262 |

FOREIGN PATENT DOCUMENTS

59-200547  11/1984  Japan .

*Primary Examiner*—Temesghen Ghebretinsae
*Assistant Examiner*—Kevin M. Burd
*Attorney, Agent, or Firm*—Stevens, Davis, Miller & Mosher, L.L.P.

[57] ABSTRACT

An estimator of error rate is provided for reducing variations of an error pulse count value at burst signals of a received signal for digital mobile communications and thereby improving an accuracy of estimating an error rate. The estimator of error rate includes detectors for detecting that phase information derived from a baseband signal of an I channel (I signal) and a baseband signal of a Q channel (Q signal) is located in an error pulse generation area, detectors for detecting that envelope information of the I signal and the Q signal is located in the error pulse generation area, and a counter for detecting that the phase error signal and the envelope error signal are outputted and counting the signals. The estimator operates to estimate an error rate based on an error pulse count value at one period. The estimator operates to detect that the phase information and the envelope information are located in the error pulse generation area. This serves to suppress the probability of counting correct signals and reducing variations of a count value at the burst signals, thereby improving an accuracy of estimating an error rate.

8 Claims, 7 Drawing Sheets

ESTIMATOR OF ERROR RATE

BACKGROUND OF THE INVENTION

1. Field of the Invention

The present invention relates to an estimator of error rate which is suitably used for a radio receiving system for digital mobile communications or the like, and more particularly to the estimator of error rate which operates to estimate an error rate through the use of phase information and envelope information of a received baseband signal.

2. Description of the Related Art

A radio receiving system for digital mobile communications such as a portable phone is required to estimate an error rate, because the system has to perform various controls according to the error rate of the received signal. However, it is impossible or difficult to precisely estimate the error rate. Hence, the system employs a technique of estimating the error rate under the certain conditions. For example, if the received signal is close to a threshold value of a middle between signal points, under a certain condition, the received signal may be estimated as an error with a probability of 50 percents. Hence, by counting the signal closing to the threshold value, it is possible to estimate the error rate.

Figure 9:
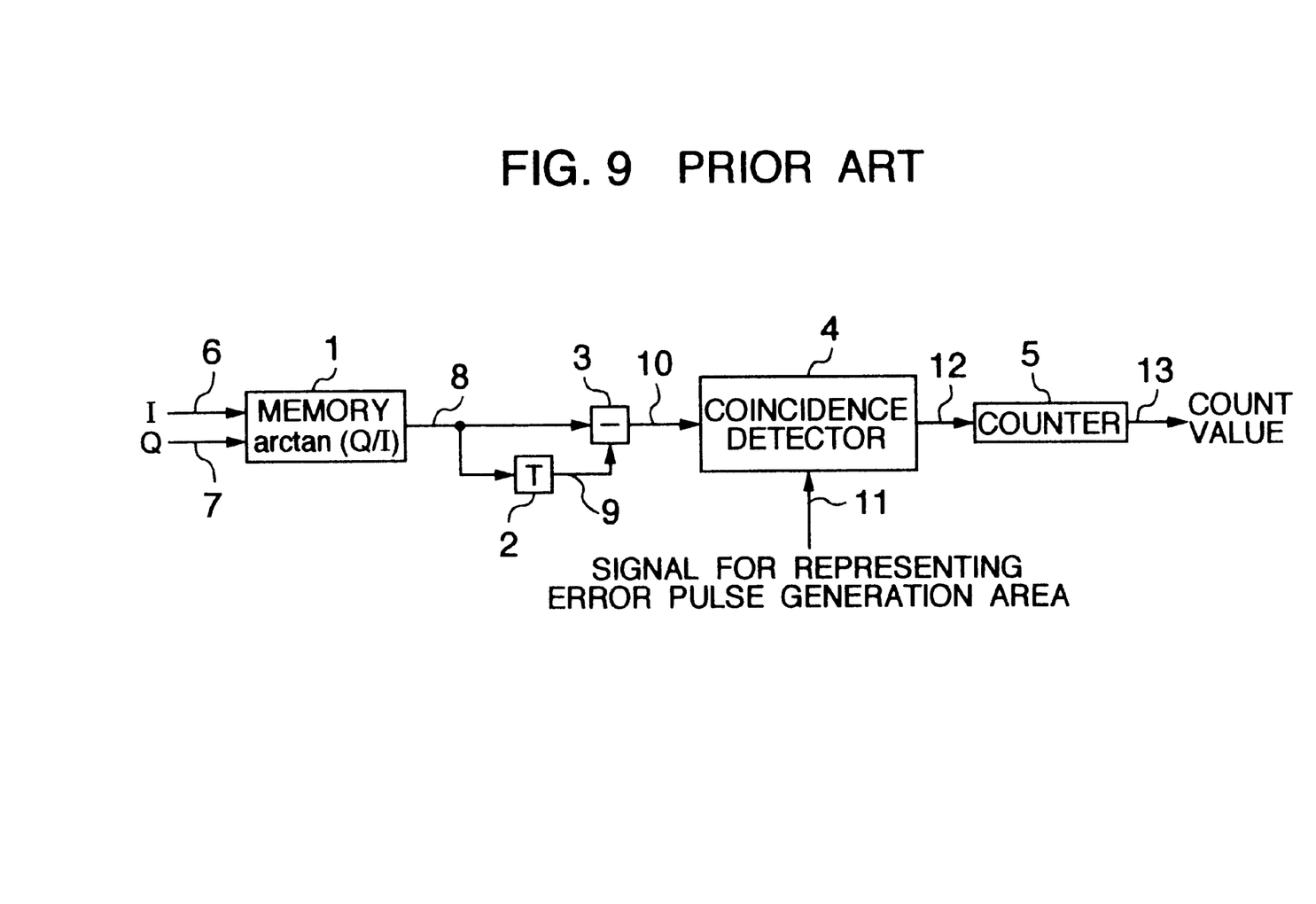
FIG. 9 is a circuit diagram showing a conventional estimator of error rate.

FIG. 9 shows an arrangement of a conventional estimator of error rate. In FIG. 9, a memory 1 operates to generate phase information 8 from a baseband signal 6 of an I channel (I signal) and a baseband signal 7 of a Q channel (Q signal). A delaying unit 2 operates to delay an input signal by one symbol period. A subtracter 3 operates to subtract the phase information of one symbol past from the phase information at the current time point. A coincidence detector 4 operates to generate an error pulse only if the input signal coincides with a signal for representing an error pulse generation area. A counter 5 operates to count the number of error pulses.

In the estimator of error rate arranged as described above, an I signal 6 and a Q signal 7 are inputted to the addresses of the memory 1. The I signal 6 is a baseband signal of the I channel derived by orthogonally detecting the received signal. The Q signal 7 is a baseband signal of the Q channel derived by the same manner. The memory 1 stores the phase information arctan(Q/I) of the I signal 6 and the Q signal. Then, by reading out the phase information from the memory 1, it is possible to obtain the phase information 8 of the I signal 6 and the Q signal 7.

Next, the phase information 8 is delayed by one symbol period through the effect of the delaying unit 2. This delay is required for demodulating an original signal from a differential phase modulated signal by the delaying detection. Then, the subtracter 3 operates to subtract the delayed phase information from the phase information 8 for deriving a delayed detection signal 10.

Next, the delayed detection signal 10 is inputted to the coincidence detector 4, in which if the signal 10 coincides with the signal 11 for representing the error pulse generation area, an error pulse signal 12 can be obtained. If the delayed detection signal 10 is close to a border value, the signal is estimated as an error signal with a probability of 50 percents. Hence, by setting the error pulse generation area to a value close to the border value, it is possible to obtain the information for estimating the error.

Lastly, an error pulse signal 12 is inputted into the counter 5. The counter 5 operates to count the number of error pulses at each burst signal and then supply a signal 13 for representing the number of error pulse counts.

The estimator of error rate arranged as described above uniformly sets the error pulse generation area relative to the phase information and generates the error pulse if the phase information coincides with the error pulse generation area. As a result, the estimator is requested to count signals that are less probably estimated as error ones if the other conditions are changed. Hence, the variations of the count value at each burst signal take place, which result in disadvantageously lowering an accuracy of estimating an error rate.

That is, the conventional estimator of error rate is arranged to estimate an error rate on the basis of only the fact that the phase information is close to the border value for determining the phase and to set certain values before and after the border value as the error pulse generation area. If the envelope information is close to a reference value, an error takes place only around the border value for phase determination. The probability that the received signal is not erroneous is high at both edges of the set error pulse generation area. Hence, the estimator counts the non-erroneous signals in some states of the envelope information, so that variations of the count value may take place.

On the other hand, the JP-A-59-200547 has disclosed provision of means for detecting an error of a channel by referring to a predetermined syndrome in a receive demodulating system apparatus located in a terminal apparatus and/or a relay apparatus. However, detection of an error on the syndrome needs a complicated calculation and a considerably long time and large circuit scale. Further, if the error rate is equal to or larger than a certain value, though an error itself can be detected, the number of errors, that is, the error rate cannot be grasped.

SUMMARY OF THE INVENTION

The present invention is made in consideration of the foregoing shortcomings, and it is an object of the present invention to provide an estimator of error rate which is arranged to estimate an error rate with high accuracy and at fast speed though it is composed of a relatively simple circuit.

According to an aspect of the invention, an estimator for estimating an error rate of data included in a phase shift keying (PSK) signal comprises a phase information generator for detecting from the received PSK signal a first baseband signal in a first detection axis and a second baseband signal in a second detection axis and generating phase information of the PSK signal based on at least the first and the second baseband signals, an envelope information generator for generating envelope information of the PSK signal based on at least the first and the second baseband signals, a phase error detector for outputting a phase error signal when the phase information indicates the PSK signal is located in the predetermined phase area, an envelope error detector for outputting an envelope error signal when the envelope information indicates the PSK signal is located in the predetermined envelope area, means for outputting an error signal in presence of both the phase error signal and the envelope error signal, and a counter for counting the error signals for a predetermined time period and outputting a count value.

This arrangement makes it possible to estimate the error rate based on the phase information and the envelope information of the PSK signal, thereby improving the estimating accuracy further than the conventional estimator arranged to use only the phase information for the estimation though it needs the substantially same time for the estimation as the conventional estimator.

DESCRIPTION OF THE PREFERRED EMBODIMENTS

Hereafter, the embodiments of the invention will be described with reference to FIGS. 1 to 8.

First Embodiment

When the system receives a differential phase shift keying signal, the radio receiving system for digital mobile communications is arranged to orthogonally detect the received signal for deriving a baseband signal of an I channel (I signal) and a baseband signal of a Q channel (Q signal), obtain the phase information by arctan(Q/I), take a difference between the phase information and a signal delayed by one symbol, and derive the resulting delayed phase information. In a case that the signal points are $\pm\pi/4$ and $\pm3\pi/4$, the border points are determined as 0, $\pi$ and $\pm\pi/2$. If the phase information is close to 0, $\pi$ and $\pm\pi/2$, it is estimated that the signal is erroneous with a probability of 50 percents. Hence, the signal is estimated to be erroneous with a high probability. That is, around the border points, the signal is determined to be a meaningless signal as a binary signal.

Assuming that the reference value is 1, it is considered that no error takes place in the envelope information if the envelope information is closer to one. Conversely, if the envelope information is close to zero, it is considered that the signal is erroneous with a high probability. Further, if the envelope information is far larger than one, the signal is estimated to be erroneous with a high probability. Hence, when the envelope information is close to the reference value, there is a high probability that the signal is not erroneous. It means that the envelope information is not approximate to estimating an error rate.

Hence, if the envelope information is around zero or far larger than 1 and the phase information is close to 0, $\pi$ or $\pm\pi/2$, it is considered that there exists a high probability that it is an error signal. That is, the signal in this area is equivalent to the noise as a binary signal. Hence, by counting the signals for meeting these two conditions, it is possible to estimate the error rate. Further, since the area does not contain the area of a low probability that the signal is an error signal, the erroneous difference among the error pulse counts of certain intervals is made lower.

Then, the estimator of error rate operates to count only the signals for meeting the condition that the phase information is close to a threshold value for determining the phase, in the state that the envelope information is close to zero or larger than the reference value, for estimating the error rate based on the count value. As a result, the estimator enables to output a correct error rate with a small estimating error.

According to a first embodiment of the invention, the estimator of error rate is arranged to detect that both of the phase information and the envelope information contained in the baseband signal of the I channel (I signal) and the baseband signal of the Q channel (Q signal) derived from the received signal are located in the corresponding error pulse generation areas and to estimate the error rate based on the detected result.

Figure 1:
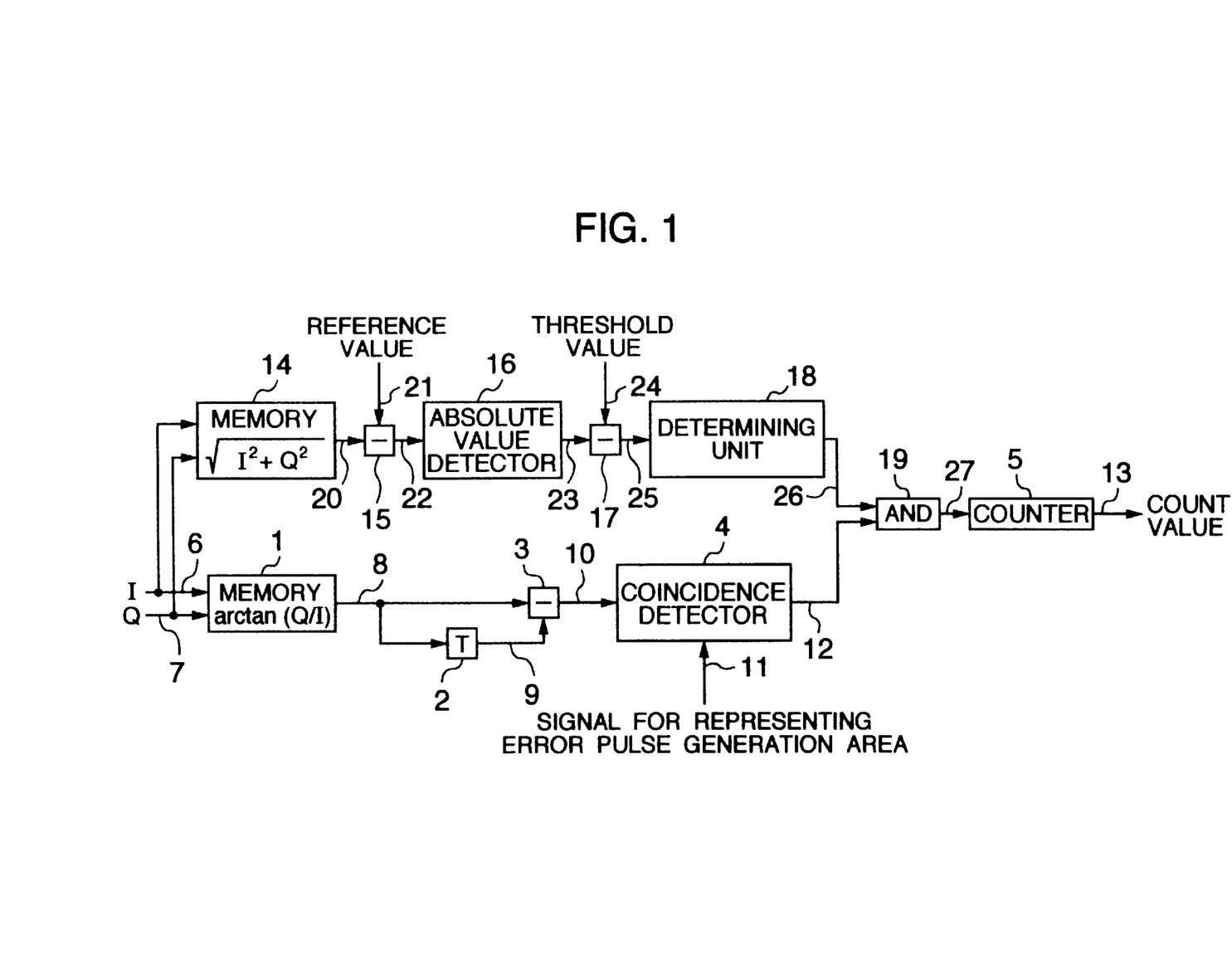
FIG. 1 is a circuit diagram showing an estimator of error rate according to a first embodiment of the invention.

The estimator of error rate according to the first embodiment of the invention will be described with reference to FIG. 1. FIG. 1 shows the arrangement of the estimator of error rate. In FIG. 1, a reference number 1 denotes a memory for generating the phase information from the I signal and the Q signal. A reference number 2 denotes a delaying unit for delaying an input signal by one symbol period. A reference number 3 denotes a subtracter for subtracting the phase information of one symbol past from the phase information at the current time point. A reference number 4 denotes a coincidence detector for generating an error pulse if the input signal coincides with the signal for representing the error pulse generation area. A reference number 5 denotes a counter for counting the number of error pulses. A reference number 14 denotes a memory for generating the envelope information from the I signal and the Q signal. A reference number 20 denotes a subtracter for subtracting a reference value from the envelope information of the I and the Q signals. A reference number 16 denotes an absolute value detector for calculating an absolute value of the input signal. A reference number 17 denotes a subtracter for subtracting a threshold value from the absolute value of the difference between the envelope information and the reference value derived by the absolute detector 16. A reference number 18 denotes a determining unit for determining the input signal. A reference number 19 denotes an AND circuit for taking a logical product of the input signals In the estimator of error rate, the I signal 6 and the Q signal 7 are inputted to the addresses of the memory 1. The memory 1 stores the phase information $\Theta=\arctan(Q/I)$ of the I signal 6 and the Q signal 7. By reading the phase information from the memory 1, therefore, the phase information 8 of the I signal 6 and the Q signal 7 can be obtained. Then, the phase information 8 is delayed by one symbol period through the effect of the delaying unit 2. Next, the subtracter 3 operates to subtract the delayed phase signal from the phase information 8 and then feed a delayed detection signal 10. Then, the delayed detection signal 10 is inputted to the coincidence detector 4. The coincidence detector 4 operates to output an error pulse signal 12 of the phase information if the signal 10 coincides with the signal 11 for representing the error pulse generation area of the phase information.

Further, the I signal 6 and the Q signal 7 are inputted to the addresses of the memory 14. The memory 14 stores the envelope information $\sqrt{(I^2+Q^2)}$ of the I signal 6 and the Q signal 7. By reading the envelope information from the memory 1, therefore, it is possible to obtain the envelope information 20 of the I signal 6 and the Q signal 7. Next, the subtracter 15 operates to subtract a reference value 21 from the envelope information 20 and output a signal 22 for representing the difference between the reference value and the envelope information of the I signal 6 and the Q signal 7. Then, the absolute value of the signal 22 is detected by the absolute value detector 16. The detector 16 outputs a signal 23 for representing the absolute value of the difference between the reference value and the envelope information of the I signal 6 and the Q signal 7. Next, the signal 23 is sent to the subtracter 17 in which a threshold value 24 is subtracted from the signal 23. The subtracter 17 outputs the resulting signal 25. Then, the signal 25 is inputted to the determining unit 18. If the signal 25 exceeds the threshold value 24, the determining unit 18 operates to output an error pulse signal 26 of the envelope information. If the envelope information is separated from the reference value by a certain value or more, the determining unit 18 operates to output an error pulse signal of the envelope information. That is, if the envelope information is close to zero or far larger than the reference value, the signal is estimated as an error signal.

Then, the error pulse signal 12 of the phase information and the error pulse signal of the envelope information are inputted to the AND circuit 19. The AND circuit 19 operates to take a logical product of both signals and output an error pulse signal 27 for meeting the error pulse generation areas of the phase information and the envelope information of the I signal 6 and the Q signal 7. Lastly, the error pulse signal 27 is inputted into the counter 5 operates to count the number of error pulses at each burst signal and output the signal for representing the error pulse count.

Figure 2:
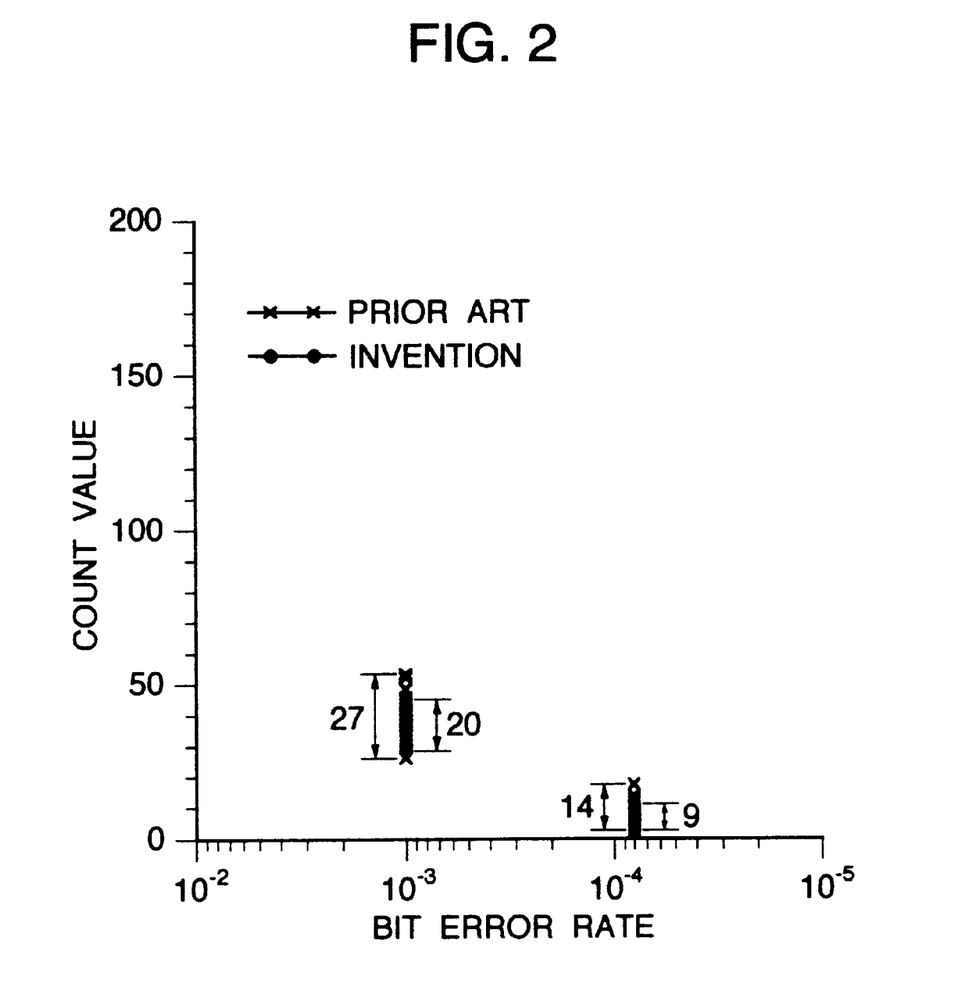
FIG. 2 is a chart showing the simulated result of the estimator of error rate shown in FIG. 1.

FIG. 2 shows the simulated result of the bit error rate and the error pulse count. From the graph of FIG. 2, the following result is obtained.

Difference between maximum count and minimum count at a bit error rate of $10^{-3}$ is as follows.

Prior Art: 27

This embodiment: 20

Difference between maximum count and minimum count at a bit error rate of $8 \times 10^{-5}$ is as follows.

Prior Art: 14

This embodiment: 9

The estimator of this embodiment enables to reduce the difference between a maximum count number and a minimum count number (for representing variations of the error pulse count numbers at the burst signals) into a factor of $2/3$ rather than the conventional estimator.

The estimator of error rate according to this embodiment operates to reduce the difference between the maximum count number and the minimum count number of the error pulse (representing variations of the error pulse count numbers at the burst signals) and thereby estimate the error rate with high accuracy.

Second Embodiment

At a low noise level and a small error occurrence rate, the error takes place only in the signal in which the phase information is very close to the border value and the envelope information is far away from the reference value. Hence, the estimator is just required to count only the signals in which the phase information is very close to the border value and the envelope information is far separate from the reference value and thereby to estimate the error rate more accurately. As such, the error pulse generation area is made variable according to the error rate so that the variations of the count value are reduced. In the second embodiment, therefore, the error pulse generation area is switched according to the error rate.

The estimator of the second embodiment provides means for varying the phase error pulse generation area in the phase error detector. The estimator operates to detect that both the phase information signal and the envelope information signal derived from the baseband signal of the I channel (I signal) and the baseband signal of the Q channel (Q signal) are located in the corresponding error pulse generation areas and thereby to estimate the error rate.

Figure 3:
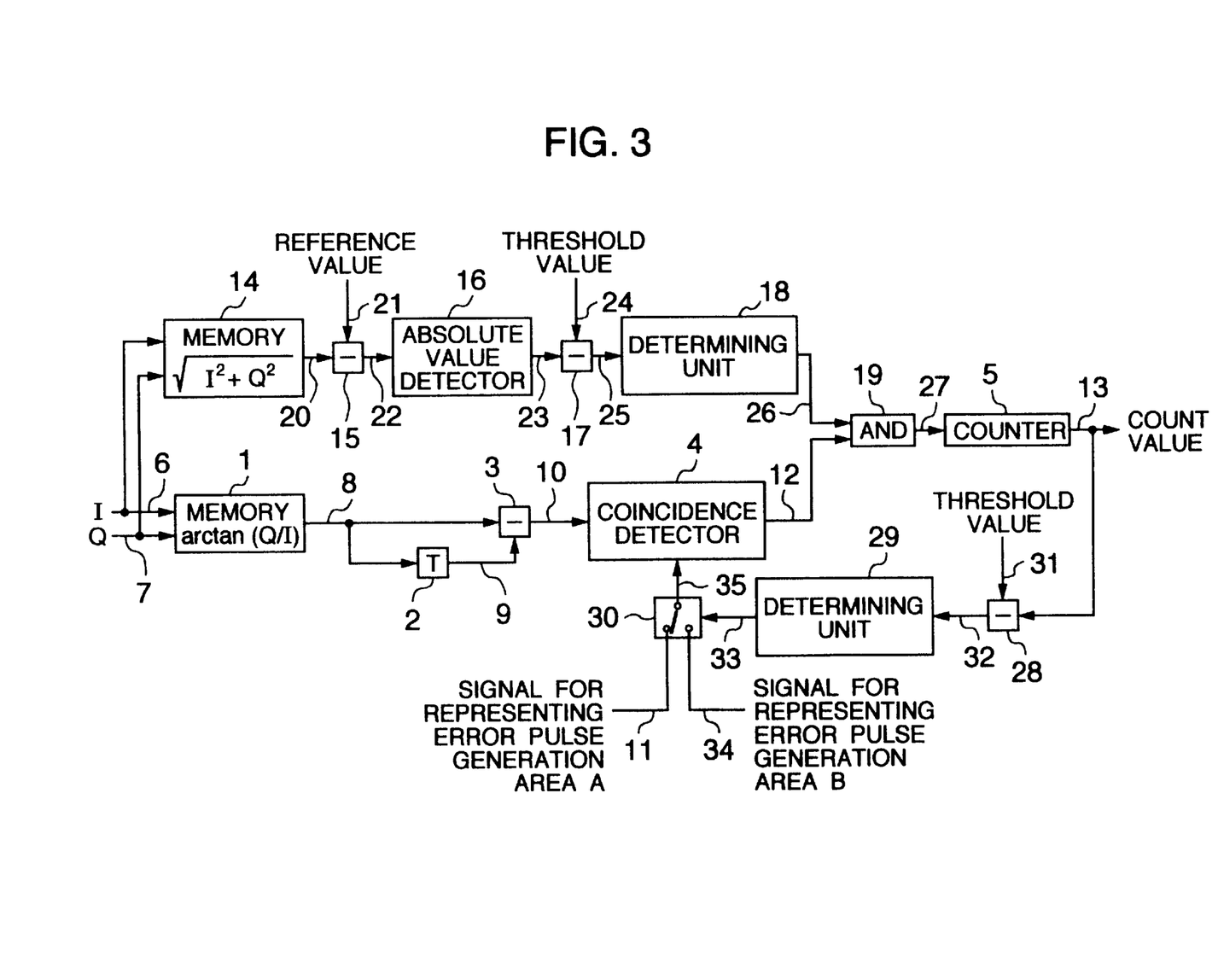
FIG. 3 is a circuit diagram showing an estimator of error rate according to a second embodiment of the invention.

FIG. 3 shows the estimator of error rate according to the second embodiment of the invention. The different respects of the second embodiment from the first embodiment are provision of a subtracter 28, a determining unit 29, and a switch 30 and that the signal for representing the error pulse generation area in the phase information is variable.

The corresponding components and the signals of the second embodiment to those described with reference to FIG. 1 have the same reference numbers and are not described in detail. The second embodiment of the invention will be described with reference to FIG. 3. As to the flow up to obtention of the error pulse count value 13, the flow of the second embodiment is the same as that of the first embodiment.

The subtracter 28 operates to subtract a threshold value 31 from the error pulse count value 13 and output it as a difference signal 32. The signal is inputted to the determining unit 29 in which it is determined if the signal 32 is positive or negative. Then, the determining unit 29 operates to output a control signal 33. The switch 30 operates to select a signal 11 (signal A for representing the error pulse generation area) or a signal 34 (signal B for representing the error pulse generation area) according to the control signal 33 and then output a signal 35 for representing the error pulse generation area of the phase information.

At a small error rate, an error takes at a closer point to the border value for determining the phase. Hence, at a small error rate, by narrowing the error pulse generation area, the estimator excludes the operation of counting signals that are less probably estimated as error signals and thereby operates to estimate the error rate more accurately.

Since the signal for representing the error pulse generation area in the phase information is variable, the estimator of the second embodiment operates to reduce the difference between the maximum count value and the minimum count value of the error pulse (variations of the error pulse count values at the burst signals) rather than the estimator of the first embodiment and thereby to estimate the error rate more accurately.

Third Embodiment

The estimator of error rate according to the third embodiment of the invention provides means for varying the error pulse generation area in both of the phase error detector and the envelope error detector. The estimator of error rate operates to detect that both of the phase information signal and the envelope information signal derived from the baseband signal of the I channel (I signal) and the baseband signal of the Q channel (Q signal) are located in the corresponding error pulse generation areas and thereby to stimate the error rate.

Figure 4:
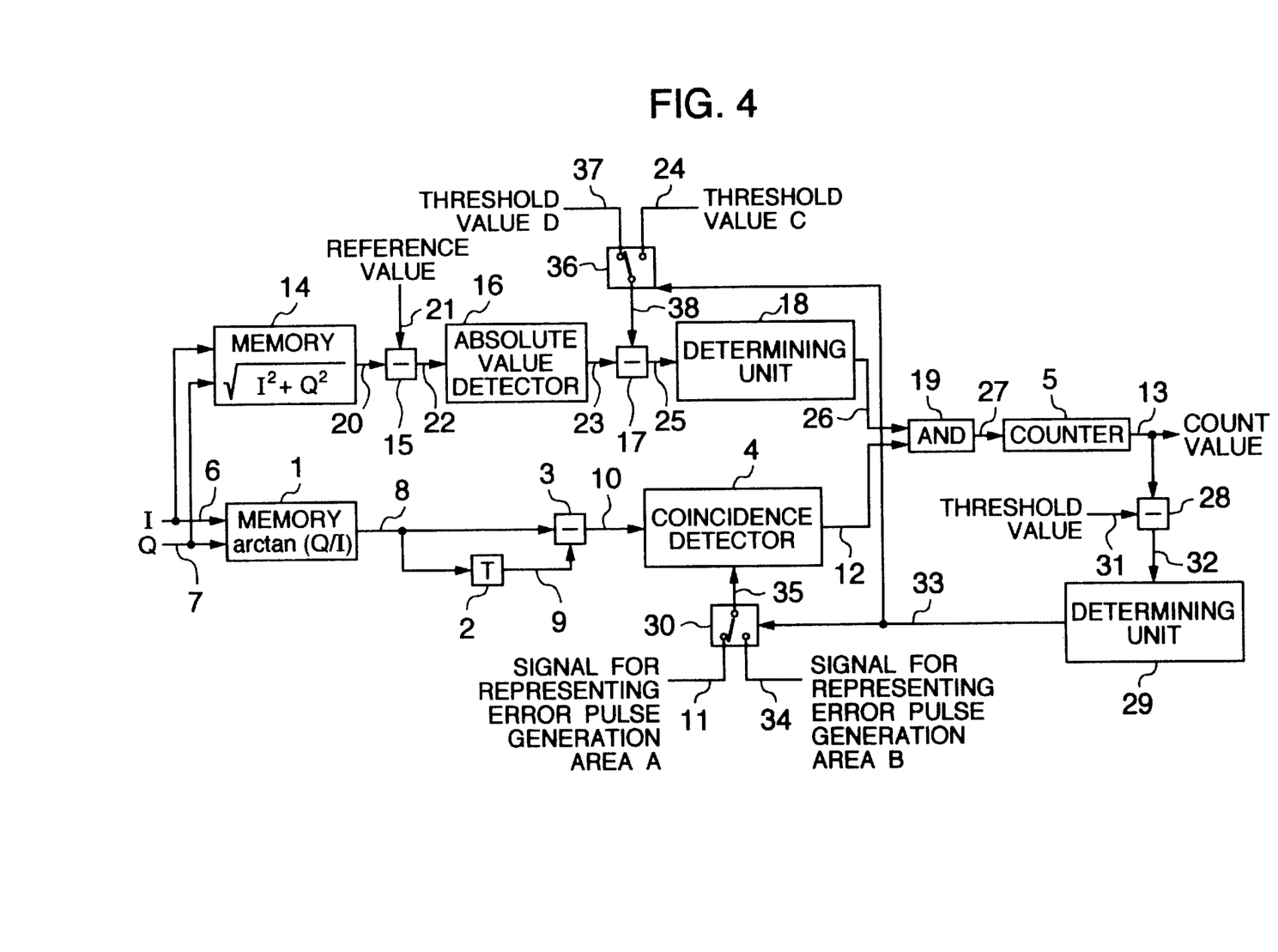
FIG. 4 is a circuit diagram showing an estimator of error rate according to a third embodiment of the invention.

FIG. 4 shows the estimator of error rate according to this embodiment of the invention. The different respects of the third embodiment from the second embodiment are provision of a switch 36 and that the signals for representing the error pulse generation areas in both of the phase information and the envelope information are variable.

The corresponding components and signals of the third embodiment to those described with reference to FIG. 2 have the same reference numbers and thus are not described in detail. Then, the estimator of error rate according to the third embodiment will be described with reference to FIG. 4. The flow of operation up to the control signal 33 is the same as that of the second embodiment.

The switch 36 operates to switch the signal 24 (threshold value C) or a signal 37 (threshold value D) according to the control signal 33 and output the threshold value 38. If the count value 13 is smaller than the threshold value 31, the switch 36 operates to select a larger threshold value according to the control signal 33. If the count value 13 is larger than the threshold value 31, the switch 36 operates to select a smaller threshold value.

As to the envelope information, it is considered that an error takes place only in the area where the envelope information is close to zero at a small error rate. If the error rate is small and the error count value is smaller than the threshold value, by limiting the error pulse generation area of the envelope information to a value around zero, the estimator enables to estimate the error rate more accurately. The error pulse generation area contains the area having a far larger value than the reference value of the envelope information. The influence of the area can be ignored, because few signals are allowed to be entered into the area.

The estimator of error rate according to the third embodiment includes the variable signals for representing the error pulse generation areas of the phase information and the envelope information. The estimator enables to reduce the difference between the maximum count value and the minimum count value of the error pulse (variations of the error pulse counts at the burst signals) more than the estimator of the second embodiment, and estimate the error rate more accurately.

Fourth Embodiment

The estimator of error rate according to the fourth embodiment of the invention includes a phase information generator and an envelope information generator. The phase information generator is composed of an absolute value circuit, a subtracter, a quadrant determining unit and a converter. The envelope information generator is composed of a comparator, a shift circuit and an adder. The estimator operates to detect that the phase information signal and the envelope information signal derived from the received baseband signal of the I channel (I signal) and the received baseband signal of the Q channel (Q signal) are located in the corresponding error pulse generation areas and estimate the error rate based on the detected result.

Figure 5:
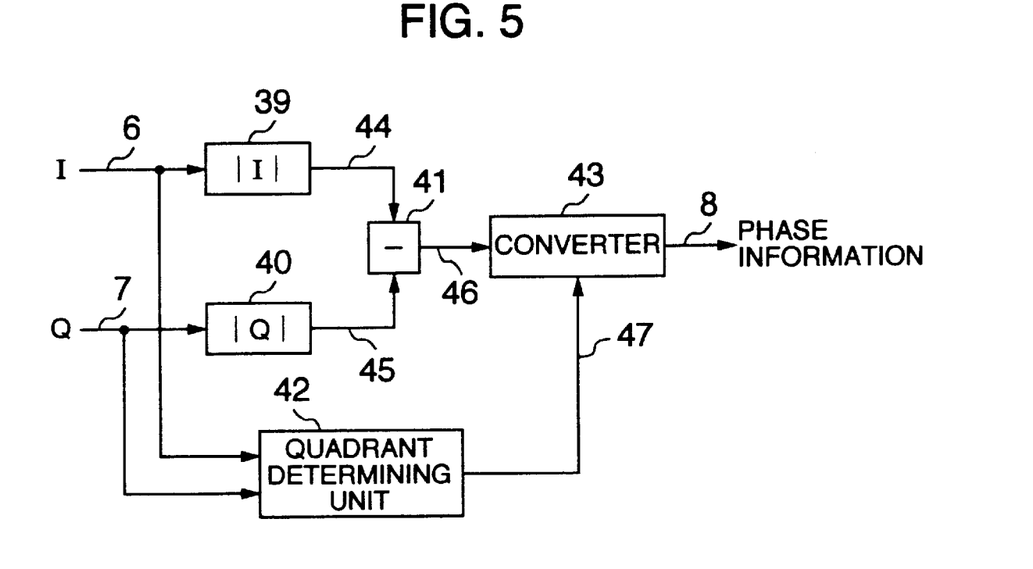
FIG. 5 is a circuit diagram showing a phase information generator according to a fourth embodiment of the invention.
Figure 7:
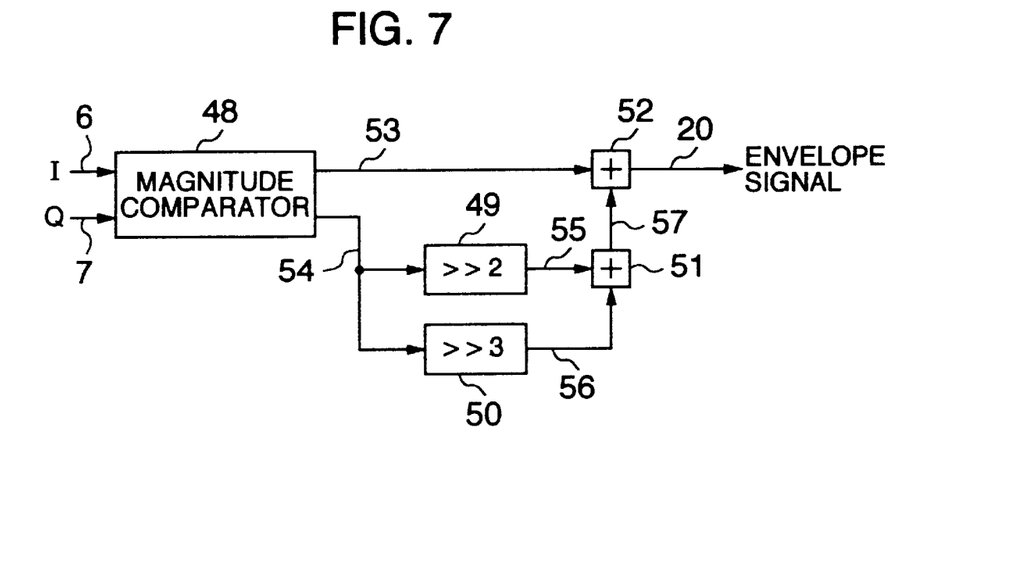
FIG. 7 is a circuit diagram showing an envelope information generator according to the fourth embodiment of the invention.

FIG. 5 shows an example of the phase information generator included in the fourth embodiment. FIG. 7 shows an example of the envelope information generator included in the fourth embodiment. The different respect of the fourth embodiment from the first to the third embodiments is that neither of the phase information generator and the envelope information generator contain any memory.

The corresponding components and signals of the fourth embodiment to those described with reference to FIG. 1 have the same reference numbers and are not described in detail. The fourth embodiment of the invention will be described with reference to FIGS. 5 and 7. At first, the description will be oriented to the phase information generator with reference to FIG. 5.

The following approximation is established about the relation between the phase $\Theta=\arctan(Q/I)$ and $|I|-|Q|$ about the I and the Q signals.

$|I|-|Q| \approx -4\Theta/\pi+1$ at the first quadrant or $4\Theta/\pi-3$ at the second quadrant or $-4\Theta/\pi-3$ at the third quadrant or $4\Theta/\pi+1$ at the fourth quadrant (1)

Figure 6:
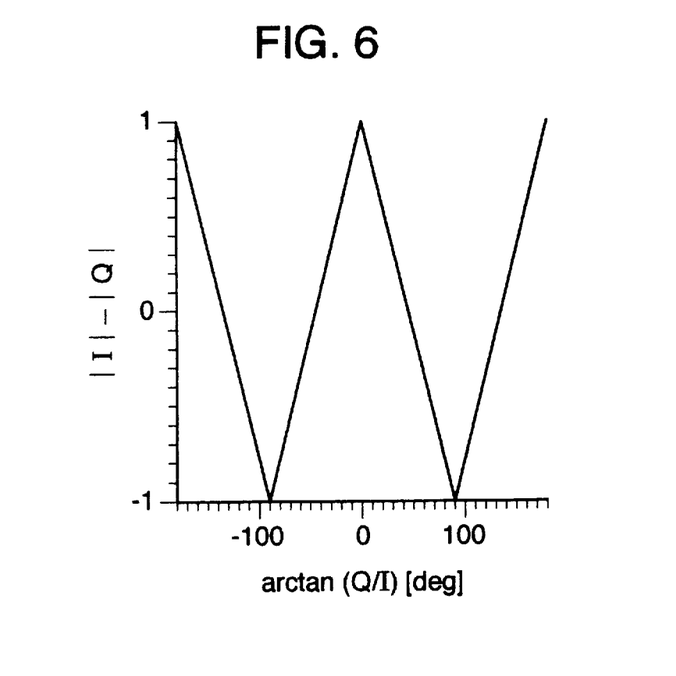
FIG. 6 is a chart showing a theoretically calculated result for describing the principle of the phase information generator shown in FIG. 5.

FIG. 6 represents the relation between the phase $\Theta=\arctan(Q/I)$ and $|I|-|Q|$ about the I and the Q signals. The phase $\Theta$ may be generated within an error of 1.8 degree by doing the approximation shown in the expression (1).

Assuming that the I and the Q signals have the reference value of ±1, the phases $\Theta$ of the I and the Q signals are ±π/4 and ±3 π/4 if the I and the Q signals both have the reference values. If one of the I and the Q signals is zero and the other has the reference value, the phases q are π and ±π/2. When the phase $\Theta$ is close to zero, $|I|-|Q|\approx 1$. When the phase $\Theta$ is close to π/4, $|I|-|Q|\approx 0$. By making a primary approximation for meeting these conditions, at the first quadrant, $|I|-|Q|\approx -4\Theta/\pi+1$ is established. At the second to the fourth quadrants, the similar approximations may be made. Under the condition that the I and the Q signals are close to ±1, the expression (1) makes a good approximation. If the condition is not met, the error is increased. If it is necessary to reduce the error, the I and the Q signals are just required to be regulated.

The I signal 6 and the Q signal 7 are inputted into an absolute value detector 39 and an absolute value detector 40, in which the absolute values of the I and the Q signals 6 and 7 are calculated. The detectors 39 and 40 operate to output the absolute value signals 44 and 45. The signals 44 and 45 are subtracted by a subtracter 41. Then, the subtracter 41 operates to output a difference signal 46. Next, the I signal 6 and the Q signal 7 are inputted into a quadrant determining unit 42. The determining unit 42 outputs a signal for representing the quadrant. Lastly, the difference signal 46 is converted according to each quadrant by a converter 43. The converter 43 operates to output the phase information 8.

Next, the description will be oriented to the envelope information generator according to the fourth embodiment with reference to FIG. 7. The following approximation is established about a presumed radius Z as the phase information and the envelope information of the I and the Q signals.

$Z=|I|+0.375\cdot|Q|$ in the case of $|I|>|Q|$ $Z=|Q|+0.375\cdot|I|$ in the case of $|Q|>|I|$ (2)

wherein a multiplication of 0.375 is implemented by doing the bit shifts and additions.

Figure 8:
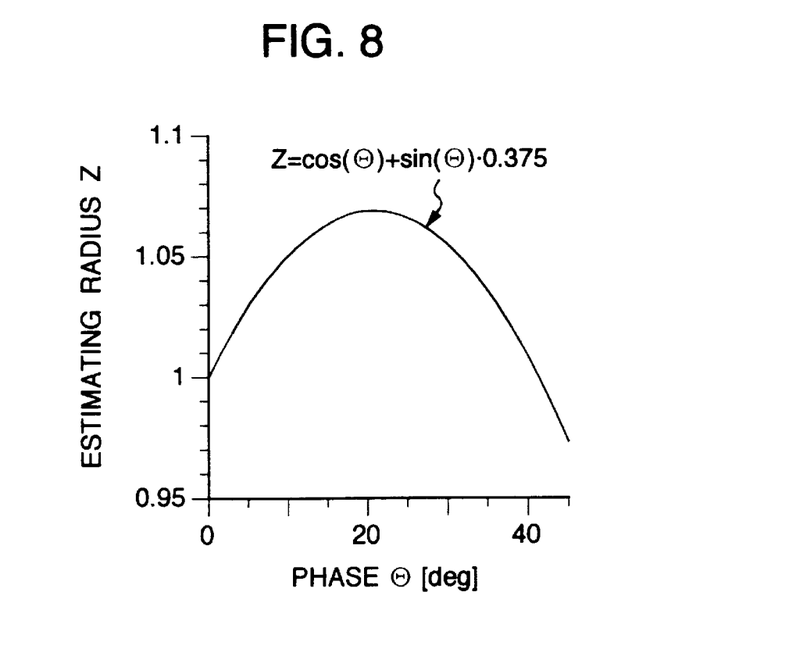
FIG. 8 is a chart showing a theoretically calculated result of characteristics of the envelope information generator shown in FIG. 7.

FIG. 8 shows the relation between the phase $\Theta$ and the presumed radius Z about the I and the Q signals. Z may be generated within the error of 7% by making the approximation shown in the expression (2). This small degree of error gives no obstacle to presuming the error rate.

The I signal 6 is compared in magnitude with the Q signal 7 by a magnitude comparator 48. The comparator 48 feeds a signal 53 ($|I|$ if $|I|>|Q|$ or $|Q|$ if $|Q|>|I|$) and a signal 54 ($|Q|$ if $|Q|<|I|$ or $|I|$ if $|I|<|Q|$). Next, the signal 54 is shifted by two bits by a 2-bits shifter 49 and by three bits by a 3-bits shifter 50 in parallel. The shifter 49 outputs a signal (signal 54·0.25) and the shifter 50 outputs a signal (signal 54·0.125). The signals 55 and 56 are added by an adder 51. Then, the adder 51 outputs a signal 57 (signal 54·0.375). Lastly, the signals 53 and 57 are added by an adder 52. Then, the adder 52 outputs the envelope information 20.

As set forth above, the estimator of the fourth embodiment does not include any memory for composing the phase information generator and the envelope information generator. The estimator of the fourth embodiment enables to estimate an error more faster than the estimators of the first to the third embodiments and speed up the signal transmission speed because it is not limited by the time consumed by the error estimation.

As is obvious from the foregoing embodiments, the estimator of error rate according to the present invention is arranged to use both of the phase information and the envelope information derived from plural baseband signals (Q signals) for reducing a difference between the maximum count value and the minimum count value of the error pulse (the variations of the error pulse count values at the burst signals, thereby being able to more accurately estimate the error rate.

Further, the estimator enables to change the error pulse generation area according to the error rate, so that it may estimate the error rate with less variation.

Moreover, the estimator of error rate enables to obtain the phase information and the envelope information with a simple circuit and at fast speed. Hence, the estimator speeds up the error estimation and the signal transmission speed.

What is claimed is:

1. An estimator for estimating an error rate of data included in a phase shift keying (PSK) signal, comprising:

a phase information generator for detecting from the received PSK signal a first baseband signal in a first detection axis and a second baseband signal in a second detection axis and generating phase information of said PSK signal on the basis of said first and second baseband signals;

an envelope information generator for generating envelope information of said PSK signal on the basis of at least said first and second baseband signals;

a phase error detector for outputting a phase error signal when said phase information indicates that said PSK signal is located in a predetermined phase area;

an envelope error detector for outputting an envelope error signal when said envelope information indicates that said PSK signal is located in a predetermined envelope area;

means for outputting an error signal in presence of both of said phase error signal and said envelope error signal; and a counter for counting said error signals for a predetermined time period and outputting a count value.

2. The estimator as claimed in claim 1, wherein said PSK signal is an quadrature phase shift keying (QPSK) signal, said first baseband signal is a baseband signal of an I channel, and said second baseband signal is a baseband signal of a Q channel.

3. The estimator as claimed in claim 1, wherein said phase error detector includes means for varying said phase area.

4. The estimator as claimed in claim 1, wherein said envelope error detector includes means for varying said envelope area.

5. The estimator as claimed in claim 1, wherein said phase information generator includes:

a first absolute value circuit for deriving an absolute value of said first baseband signal;

a second absolute value circuit for deriving an absolute value of said second baseband signal;

a subtracter for deriving a difference between an output signal of said first absolute value circuit and an output signal of said second absolute value circuit;

a quadrant determining unit for determining what quadrant said PSK signal is located, based on said first and second baseband signals; and a converter for deriving said phase information of said PSK signal from an output signal of said subtracter, based on the determined result of said quadrant determining unit.

6. The estimator as claimed in claim 2 wherein said phase information generator includes:

a first absolute value circuit for deriving an absolute value of said I signal;

a second absolute value circuit for deriving an absolute value of said Q signal;

a subtracter for deriving a difference between an output signal of said first absolute value circuit and an output signal of said second absolute value circuit;

a quadrant determining unit for determining what quadrant said QPSK signal is located, based on said I signal and said Q signal; and a converter for deriving said phase information of said QPSK signal from an output of said subtracter, based on the determined result of said quadrant determining unit.

7. The estimator as claimed in claim 1, wherein said envelope information generator includes:

a comparator for comparing an absolute value of said first baseband signal with an absolute value of said second baseband signal;

coefficient circuits for multiplying a smaller one of said absolute values of said I signal and said Q signal by a coefficient by shifting said smaller one by bits; and an adder for adding an output signal of said coefficient circuits to a larger one of said absolute values of said I signal and said Q signal.

8. The estimator as claimed in claim 2, wherein said envelope information generator includes:

a comparator for comparing an absolute value of said I signal with an absolute value of said Q signal;

coefficient circuits for multiplying a smaller one of said absolute values of said I signal and Q signal by coefficients by shifting said smaller one by bits; and an adder for adding a larger one of said absolute values of said I and Q signals to an output signal of said coefficient circuits.

* * * * *